(12) United States Patent
Lee et al.

(10) Patent No.: US 11,432,909 B2
(45) Date of Patent: Sep. 6, 2022

(54) APPARATUS AND METHOD FOR GENERATING IMAGE OF CORRECTED TEETH

(71) Applicant: LAON MEDI INC., Seongnam-si (KR)

(72) Inventors: Seonggon Lee, Seongnam-si (KR); Jae Min Park, Seongnam-si (KR); Suk Joong Lee, Seoul (KR)

(73) Assignee: LAON MEDI INC., Seongnam-si (KR)

( * ) Notice: Subject to any disclaimer, the term of this patent is extended or adjusted under 35 U.S.C. 154(b) by 605 days.

(21) Appl. No.: 16/431,484

(22) Filed: Jun. 4, 2019

(65) Prior Publication Data
US 2020/0113649 A1 Apr. 16, 2020

(30) Foreign Application Priority Data
Oct. 12, 2018 (KR) .......................... 10-2018-0121885

(51) Int. Cl.
*A61C 7/00* (2006.01)
*G06F 30/00* (2020.01)
*H04N 5/225* (2006.01)

(52) U.S. Cl.
CPC .............. *A61C 7/002* (2013.01); *G06F 30/00* (2020.01); *H04N 5/225* (2013.01); *A61C 2007/004* (2013.01)

(58) Field of Classification Search
CPC ... A61C 7/002; A61C 2007/004; G06F 30/00; H04N 5/225; G06T 2207/30036
See application file for complete search history.

(56) References Cited

U.S. PATENT DOCUMENTS

| 10,456,225 | B2 * | 10/2019 | Jesenko | ............. A61C 13/0004 |
| 2004/0197727 | A1 | 10/2004 | Sachdeva et al. | |
| 2005/0043837 | A1 * | 2/2005 | Rubbert | ................... A61C 7/00 700/98 |

(Continued)

FOREIGN PATENT DOCUMENTS

| CN | 103932807 | * | 7/2014 |
| CN | 103932807 | A | 7/2014 |
| CN | 108470365 | A | 8/2018 |

(Continued)

OTHER PUBLICATIONS

Cheng et al. "Personalized Orthodontic Accurate Tooth Arrangement System with Complete Teeth Model". DOI 10.1007/s10916-015-0269-4. J Med Syst (2015) 39: 84. (Year: 2015).*

(Continued)

*Primary Examiner* — Eunhee Kim
(74) *Attorney, Agent, or Firm* — KORUS Patent, LLC; Seong Il Jeong

(57) ABSTRACT

Disclosed herein are an apparatus and method for generating an image of corrected teeth. The apparatus includes: a control unit configured to generate dental curves representative of dental arches after the completion of correction from an image of teeth, and to generate an image of corrected virtual teeth by aligning the locations of the teeth with the dental curves; and an input/output unit configured to provide the image of corrected virtual teeth via a screen. The control unit is further configured to model the dental curves with functions corresponding to sets of teeth.

16 Claims, 10 Drawing Sheets

(56) References Cited

U.S. PATENT DOCUMENTS

| | | | | |
|---|---|---|---|---|
| 2016/0175068 A1* | 6/2016 | Cai | .................. | G06F 30/00 |
| | | | | 700/98 |
| 2021/0196213 A1* | 7/2021 | Sakamoto | .............. | A61B 6/032 |

FOREIGN PATENT DOCUMENTS

| | | |
|---|---|---|
| JP | 2018-526035 A | 9/2018 |
| KR | 10-2002-0072318 A | 9/2002 |
| KR | 10-2005-0082526 A | 8/2005 |
| KR | 10-2011-0065766 A | 6/2011 |
| KR | 10-2013-0044932 A | 5/2013 |
| KR | 10-2015-0039028 A | 4/2015 |
| KR | 10-1518709 B1 | 5/2015 |
| KR | 10-1612846 B1 | 4/2016 |
| KR | 10-2016-0082842 A | 7/2016 |
| KR | 10-2016-0083788 A | 7/2016 |
| KR | 10-2017-0125263 A | 11/2017 |
| KR | 10-1827354 B1 | 2/2018 |
| KR | 10-1829409 B1 | 2/2018 |
| KR | 10-1891289 B1 | 8/2018 |
| WO | 2004/098379 A2 | 11/2004 |

OTHER PUBLICATIONS

Ardzijauskaitó . "Approximation of Maxillary Arch Shape by Mathematical Functions". IEEE International Workshop on Intelligent Data Acquisition and Advanced Computing Systems: Technology and Applications/\. Sep. 21-23, 2009. (Year: 2009).*

Dahiya et al. "Effects of unilateral premolar extraction treatment on the dental arch forms of Class II subdivision malocclusions". American Journal of Orthodontics and Dentofacial Orthopedics Aug. 2017. vol. 152. Issue 2. pp. 232-241. (Year: 2017).*

Grimm et al. "Nonlinear Growth Curves in Developmental Research". Child Dev. Sep. 2011 ; 82(5): 1357-1371. doi:10.1111/j.1467-8624. 2011.01630.x.. 22 Pages. (Year: 2011).*

Kondo et al. "Tooth Segmentation of Dental Study Models Using Range Images". IEEE Transactions on Medical Imaging, vol. 23, No. 3, Mar. 2004. 13 pages. (Year: 2004).*

Kumar. "Automated Virtual Treatment Planning in Orthodontics: Modeling and Algorithms". A Dissertation Submitted to the Faculty of the Graduate School of the University of Minnesota. Jul. 2012. 160 Pages. (Year: 2012).*

Yaqi et al. "Computer Aided Orthodontics Treatment by Virtual Segmentation and Adjustment". 2010 IEEE. 4 pages. (Year: 2010).*

Wang Zeng-Bo, Research on Methods of Drawing Dental Arch during Virtual Orthodontics Treatment Process, Journal of Guizhou University (Natural Sciences), Dec. 2011, pp. 62-65, vol. 28, No. 6, DOI: 1000-5269(2011) 06-0062-04.

* cited by examiner

APPARATUS AND METHOD FOR GENERATING IMAGE OF CORRECTED TEETH

CROSS-REFERENCE TO RELATED APPLICATION

This application claims the benefit of Korean Patent Application No. 10-2018-0121885 filed on Oct. 12, 2018, which is hereby incorporated by reference herein in its entirety.

BACKGROUND

1. Technical Field

The present invention relates generally to an apparatus and method for generating an image of corrected teeth. More specifically, the present invention relates to an apparatus and method for generating an image of corrected teeth, which may provide an image of corrected virtual teeth based on an image of teeth of a user.

2. Description of the Related Art

In recent years, there has been practiced orthodontics that performs functional and aesthetic treatments by moving teeth to desired locations. Orthodontics has a function of preventing a disease or illness that may occur due to malocclusion or the like attributable to uneven teeth.

Orthodontics gradually moves the locations of teeth and then fastens the locations of the teeth. However, neither a doctor nor a patient can predict the shape of the teeth after the completion of correction, and thus a problem arises in that it is not easy to select an orthodontic means or orthodontic treatment method.

Meanwhile, Korean Patent Application Publication No. 10-2013-0044932 discloses a method of generating image matching information for orthodontic treatment, which increases the accuracy of the acquisition of an image of teeth by removing noise from a computed tomography (CT) image of the teeth and also combining the three-dimensional scan data of the teeth, thereby providing the accurate shape of teeth and occlusion information.

Therefore, there is a need for technology for overcoming the above-described problem.

Meanwhile, the above-described related art corresponds to technical information that has been possessed by the present inventor in order to contrive the present invention or that has been acquired during a process of contriving the present invention, and cannot be necessarily viewed as well-known technology that has been known to the public before the filing of the present application.

SUMMARY

Embodiments disclosed in the present specification provide an apparatus and method for generating an image of corrected teeth, which may provide an image of corrected virtual teeth based on an image of teeth of a user.

Embodiments disclosed in the present specification provide an apparatus and method for generating an image of corrected teeth methods and apparatuses, which may automate an operation of generating an image of corrected virtual teeth.

Embodiments disclosed in the present specification provide an apparatus and method for generating an image of corrected teeth methods and apparatuses, which may improve convenience by minimizing the intervention of a user in the generation of an image of corrected virtual teeth.

Embodiments disclosed in the present specification provide an apparatus and method for generating an image of corrected teeth methods and apparatuses, which may minimize the time required for the generation of an image of corrected virtual teeth.

According to an aspect of the present invention, there is provided an apparatus for generating an image of corrected teeth, the apparatus including: a control unit configured to generate dental curves representative of dental arches after the completion of correction from an image of teeth, and to generate an image of corrected virtual teeth by aligning the locations of the teeth with the dental curves; and an input/output unit configured to provide the image of corrected virtual teeth via a screen; wherein the control unit is further configured to model the dental curves with functions corresponding to sets of teeth.

According to another aspect of the present invention, there is provided a method of generating an image of corrected teeth, the method being performed by an apparatus for generating an image of corrected teeth, the method including: generating dental curves representative of dental arches after the completion of correction from an image of teeth; generating an image of corrected virtual teeth by aligning the locations of the teeth with the dental curves; and providing the image of corrected virtual teeth via a screen; wherein generating the dental curves comprises modeling the dental curves with functions corresponding to sets of teeth.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Various embodiments will be described in detail below with reference to the accompanying drawings. The following embodiments may be modified and practiced in various different forms. In order to more clearly describe the features of the embodiments, detailed descriptions of items well known to those having ordinary knowledge in the art to which the embodiments pertain will be omitted. Furthermore, parts unrelated to descriptions of the embodiments will be omitted in the accompanying drawings, and similar reference symbols will be assigned to similar parts throughout the specification.

Throughout the specification, when a component is described as being "connected to another component," this includes not only a case where they are "directly connected to each other" but also a case where they are "connected to each other with a third component interposed therebetween." Furthermore, when a component is described as "including" another component, this means that a third component is not excluded but may be further included, unless particularly described to the contrary.

Embodiments of the present invention will be described in detail below with reference to the accompanying drawings.

Figure 1:
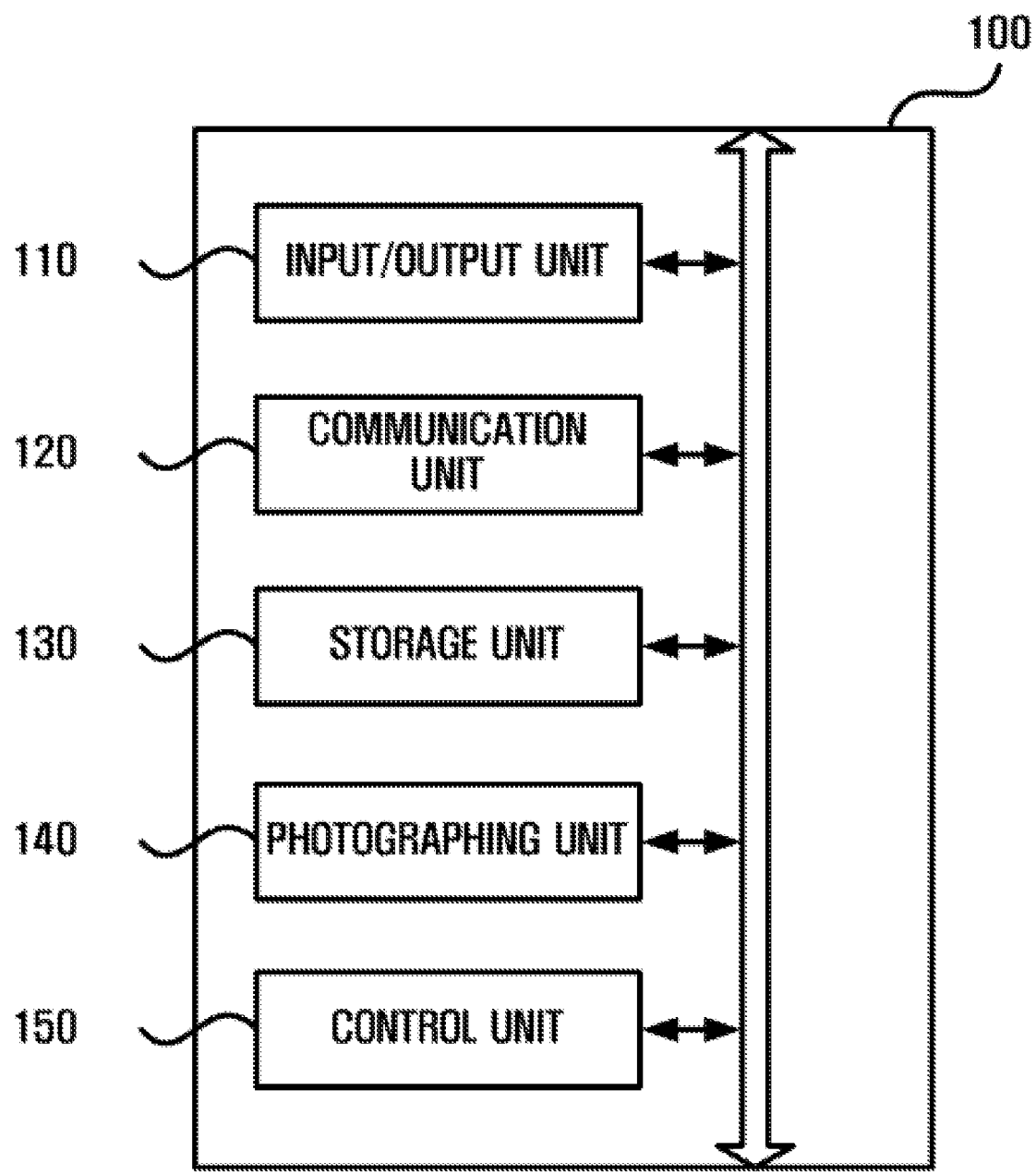
FIG. 1 is a block diagram showing an apparatus for generating an image of corrected teeth according to an embodiment.

FIG. 1 is a block diagram showing an apparatus 100 for generating an image of corrected teeth according to an embodiment.

Referring to FIG. 1, the apparatus 100 for generating an image of corrected teeth may generate an image of corrected teeth.

As shown in FIG. 1, the apparatus 100 for generating an image of corrected teeth may provide an image, showing the shape of corrected virtual teeth, based on an image of teeth of a user.

The apparatus 100 for generating an image of corrected teeth may include an input/output unit 110, a communication unit 120, a storage unit 130, a photographing unit 140, and a control unit 150.

The input/output unit 110 may include an input unit configured to receive input from a user and an output unit configured to display information, such as the result of treatment, the state of the apparatus 100 for generating an image of corrected teeth, or the like. For example, the input/output unit 110 may include an operation panel configured to receive user input and a display panel configured to display a screen.

More specifically, the input unit may include devices configured to receive various types of user input, such as a keyboard, physical buttons, a touch screen, a camera, a microphone, etc. Furthermore, the output unit may include a display panel, a speaker, etc. However, the input/output unit 110 is not limited thereto, but may include various types of devices configured to support input and output.

The communication unit 120 may perform wired/wireless communication with another device or a network. For this purpose, the communication unit 120 may include a communication module configured to support at least one of various wired/wireless communication methods. For example, the communication module may be implemented in the form of a chipset.

The wireless communication supported by the communication unit 120 may be, for example, Wireless Fidelity (Wi-Fi), Wi-Fi Direct, Bluetooth, Ultra Wide Band (UWB), Near Field Communication (NFC), or the like. Furthermore, the wired communication supported by the communication unit 120 may be, for example, USB, High Definition Multimedia Interface (HDMI), or the like. The above-described communication methods are merely examples, and various types of communication techniques configured to enable the apparatus 100 for generating an image of corrected teeth to perform communication may be applied.

The communication unit 120 may receive an image of teeth of a user, and may transmit an image of corrected virtual teeth to another device.

Various types of data, such as a file, an application, a program, etc., may be installed on and stored in the storage unit 130. The data stored in the storage unit 130 may be accessed and used by the control unit 150 to be described later, or new data may be stored in the storage unit 130 by the control unit 150. Furthermore, the storage unit 130 may store a program that is executable by the control unit 150. According to an embodiment, the storage unit 130 may store an image of teeth, and may also store an image of corrected virtual teeth. The storage unit 130 may store a program configured to generate an image of corrected virtual teeth from an image of teeth of a user.

The photographing unit 140 may photograph an image of teeth of a user that is used to acquire an image of corrected virtual teeth. For this purpose, the photographing unit 140 may include a camera, an X-ray machine, or the like configured to photograph an image, and may include other various photographing devices configured to photograph teeth. Meanwhile, when an image is acquired from various independent photographing devices present outside the apparatus 100 for generating an image of corrected teeth, the photographing unit 140 may not be included.

The control unit 150 may control the overall operation of the apparatus 100 for generating an image of corrected teeth, and may include a processor, such as a CPU or the like. The control unit 150 may control other components included in the apparatus 100 for generating an image of corrected teeth so that they perform an operation corresponding to user input received via the input/output unit 110.

According to the present embodiment, the control unit 150 may generate an image of corrected virtual teeth by using an image of the teeth of both jaws. For this purpose, the control unit 150 may receive an image of teeth via the photographing unit 140, and may receive an image of teeth via the communication unit 120.

The control unit 150 may generate dental curves representative of dental arches after the completion of correction based on an image of teeth. The control unit 150 may generate dental curves based on both jaws. In other words, the control unit 150 may generate a dental curve corresponding to the upper jaw and a dental curve corresponding to the lower jaw. The control unit 150 may generate U-shaped dental curves corresponding to the dental arches of both jaws. The control unit 150 may model dental curves with a function corresponding to the sets of teeth of a user.

When dental curves are acquired after the modeling of the dental curves corresponding to the dental arches has been completed, the control unit 150 aligns the locations of teeth with the dental curves. The control unit 150 may align the locations of the teeth of both jaws in order to represent a corrected virtual state. When the locations of all the teeth have been aligned, the control unit 150 may generate an image of corrected teeth by using the aligned teeth, and may provide the image of corrected teeth to the input/output unit 110 so that the image of corrected teeth may be displayed via a screen.

The operation of the control unit 150 will be described in greater detail below with reference to FIG. 2.

Figure 2:
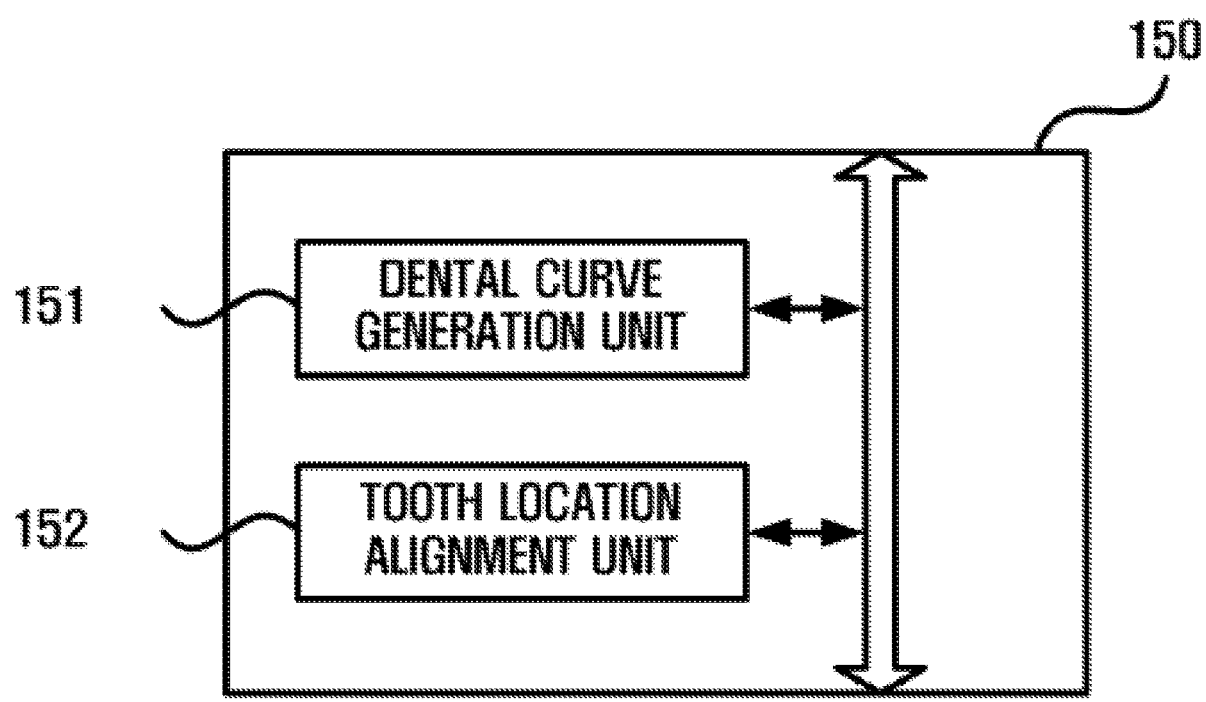
FIG. 2 is a block diagram of a control unit according to an embodiment.

FIG. 2 is a block diagram of the control unit 150 according to an embodiment.

Referring to FIG. 2, the control unit 150 may include a dental curve generation unit 151 and a tooth location alignment unit 152.

The dental curve generation unit 151 may generate dental curves corresponding to the dental arches of a user in order to generate an image of corrected teeth. For this purpose, the dental curve generation unit 151 may determine the locations of teeth based on the image of the teeth. The dental curve generation unit 151 may model the dental curves with a function corresponding to the locations of the teeth, i.e., the sets of teeth.

The dental curve generation unit 151 may generate the dental curves by modeling them based on surfaces based on which the sets of teeth have been photographed, prior to the modeling of the dental curves. The dental curve generation unit 151 may generate the dental curves so that they are located on the X axis corresponding to a direction parallel to a facial surface and the Z axis corresponding to a direction vertical to the facial surface. In this case, the X axis and the Z axis may be orthogonal to each other.

For example, the dental curve generation unit 151 may model the dental curves by using the mathematical constant. The dental curve generation unit 151 may model the dental curves with the following Equation 1 using the mathematical constant;

$$z = a * e^{b*x} + c \quad (1)$$

where a is a variable representative of a scale in the Z axis, e is the mathematical constant, b is a variable representative of a scale in the X axis, and c is a variable representative of the parallel translation of the dental curves. The dental curve generation unit 151 may determine a curve model configured to generate dental curves by using Equation 1, and may perform fitting to the sets of teeth by using the determined curve model.

The dental curve generation unit 151 may generate curves for sets of teeth which are each divided into left and right sides in each of both jaws. In this case, the dental curve generation unit 151 may generate four curves corresponding to the left side teeth of the lower jaw, the right side teeth of the lower jaw, the left side teeth of the upper jaw, and the right side teeth of the upper jaw by generating two curves for the left and right side teeth of the lower jaw and two curves for the left and right side teeth of the upper jaw. The four curves generated by the dental curve generation unit 151 may be modeled by Equation 1.

The dental curve generation unit 151 selects a curve most appropriate for the shape of corrected virtual teeth from among the four curves. For this purpose, the curve generation unit 151 may calculate covariance values for the respective four curves, and may select a curve having the smallest covariance value. In this case, the curve generation unit 151 may generate dental curves by matching the selected curve to the left and right teeth of both jaws.

Alternatively, the dental curve generation unit 151 may calculate the average value of the four curves. The dental curve generation unit 151 may calculate the average of the four curves, and may generate a single average curve having an average value. The dental curve generation unit 151 may generate an average curve modeled by averaging the a, b and c values of the curves modeled by Equation 1. In this case, the dental curve generation unit 151 may generate the dental curves by matching the average curve to the left and right side teeth of both jaws.

For example, the dental curve generation unit 151 may model the dental curves with a curve function. The dental curve generation unit 151 may model the dental curves with the following Equation 2 using a curve function:

$$z = a_n x^n + a_{n-1} x^{n-1} + \cdots + a_1 x^1 + a_0 x^0 \quad (2)$$

where n is a natural number, $a_n$ is a variable used to apply a slope to the dental curves, and $x^n$ is a polynomial curve function used to generate the dental curves. The dental curve generation unit 151 determines a curve model used to generate the dental curves by using Equation 2, and may perform fitting to the sets of teeth by using the determined curve model.

For example, the dental curve generation unit 151 may model the dental curves by using spline interpolation. The dental curve generation unit 151 may model the dental curves by using cubic spline interpolation, which is a type of spline interpolation.

In this case, although the dental curve generation unit 151 may perform the above operation based on all teeth, it may perform the above operation based on at least some teeth selected from among all the teeth. For example, the dental curve generation unit 151 may select teeth, such as main teeth (front teeth, molar teeth, and canine teeth), and may generate dental curves by performing spline interpolation based on the selected teeth.

The tooth location alignment unit 152 may align the locations of teeth to be corrected by using the dental curves generated by the dental curve generation unit 151. For this purpose, the tooth location alignment unit 152 may align the locations of teeth to be corrected by determining the locations of corrected virtual teeth based on the dental curves.

The tooth location alignment unit 152 may determine a median point between reference teeth, e.g., front teeth, among the teeth to be a correction location based on the Z axis. Accordingly, the tooth location alignment unit 152 may make a setting such that a median point between two front teeth in each of the upper and lower jaws is located on the Z axis.

The tooth location alignment unit 152 may set at least one point on each of adjacent teeth on the Y axis based on the longitudinal direction of teeth, i.e., the direction in which the teeth grow. The tooth location alignment unit 152 may calculate vector distances between the points set for the individual adjacent teeth. In this case, the tooth location alignment unit 152 may calculate vector distances after dividing two or more regions based on the Y axis, and may calculate vector distances between points within the divided regions. Via this process, the tooth location alignment unit 152 may calculate vector distances in the divided regions, and may thus reduce the computational time required for the determination of the locations of corrected virtual teeth. Meanwhile, the X axis, the Y axis, and the Z axis may be orthogonal to one another.

When the location of a reference tooth (e.g., a front tooth) is determined, the tooth location alignment unit 152 may determine the locations of the teeth by calculating vector distances sequentially from a tooth adjacent to the reference tooth. The tooth location alignment unit 152 may align the locations of the teeth without an overlap on the dental curves based on the vector distances.

For example, for a tooth located on the right side of each of both jaws (on the right side of the upper or lower jaw), the tooth location alignment unit 152 may determine a vector distance to be negative (−) when the Z-axis component of the vector distance is positive (+) and the X-axis component of the vector distance is positive (+), and may determine a vector distance to be positive (+) when the Z-axis component of the vector distance is negative (−) and the X-axis component of the vector distance is negative (−).

Furthermore, for a tooth located on the left side of each of both jaws (on the left side of the upper or lower jaw), the tooth location alignment unit 152 may determine a vector distance to be negative (−) when the Z-axis component of the vector distance is positive (+) and the X-axis component of the vector distance is negative (−), and may determine a vector distance to be positive (+) when the Z-axis component of the vector distance is negative (−) and the X-axis component of the vector distance is positive (+).

Via the above-described process, the tooth location alignment unit 152 may calculate vector distances sequentially from a tooth adjacent to the reference tooth. For example, when a front tooth is the reference tooth, the tooth location alignment unit 152 may move the reference tooth along a dental curve based on the Z axis until it has a value equal to or larger than 0 or equal to or smaller than 0 based on 0 on the X axis with respect to a tooth adjacent in the front. In this case, when the center of the X axis (the point where the X axis intersects the Z axis) is set to 0, the tooth location alignment unit 152 may determine the location by locating the reference tooth at the center of the X axis and then moving the reference tooth in a direction in which an X component has a plus (+) value (for a right tooth) or a direction in which an X component has a minus (−) value (for a left tooth).

Thereafter, the tooth location alignment unit 152 may determine the locations of the remaining teeth (e.g., teeth Nos. 2, 3, 4, 5, 6 and 7) excluding the reference tooth (e.g., tooth No. 1) by performing sequential movement based on teeth that are located in the front and adjacent to each other until both the X and Z components of a vector distance do not have a negative value.

When the locations of all the teeth are determined on the dental curves, the tooth location alignment unit 152 may generate an image of corrected virtual teeth. The tooth location alignment unit 152 provides the image of virtual teeth to the input/output unit 110 so that the image is displayed on a display screen or the like or printed via a printing device, such as a printer.

As described above, the apparatus 100 for generating an image of corrected teeth according to the proposed embodiment may provide an image of corrected virtual teeth based on an image of teeth of a user. Furthermore, the apparatus 100 for generating an image of corrected teeth may automatically generate an image of corrected virtual teeth without the intervention of a user, and does not require the manipulation of the user, thereby improving convenience regarding the generation of an image of corrected teeth. Via this process, the apparatus 100 for generating an image of corrected teeth may minimize the time required for the generation of an image of corrected teeth.

Figure 3:
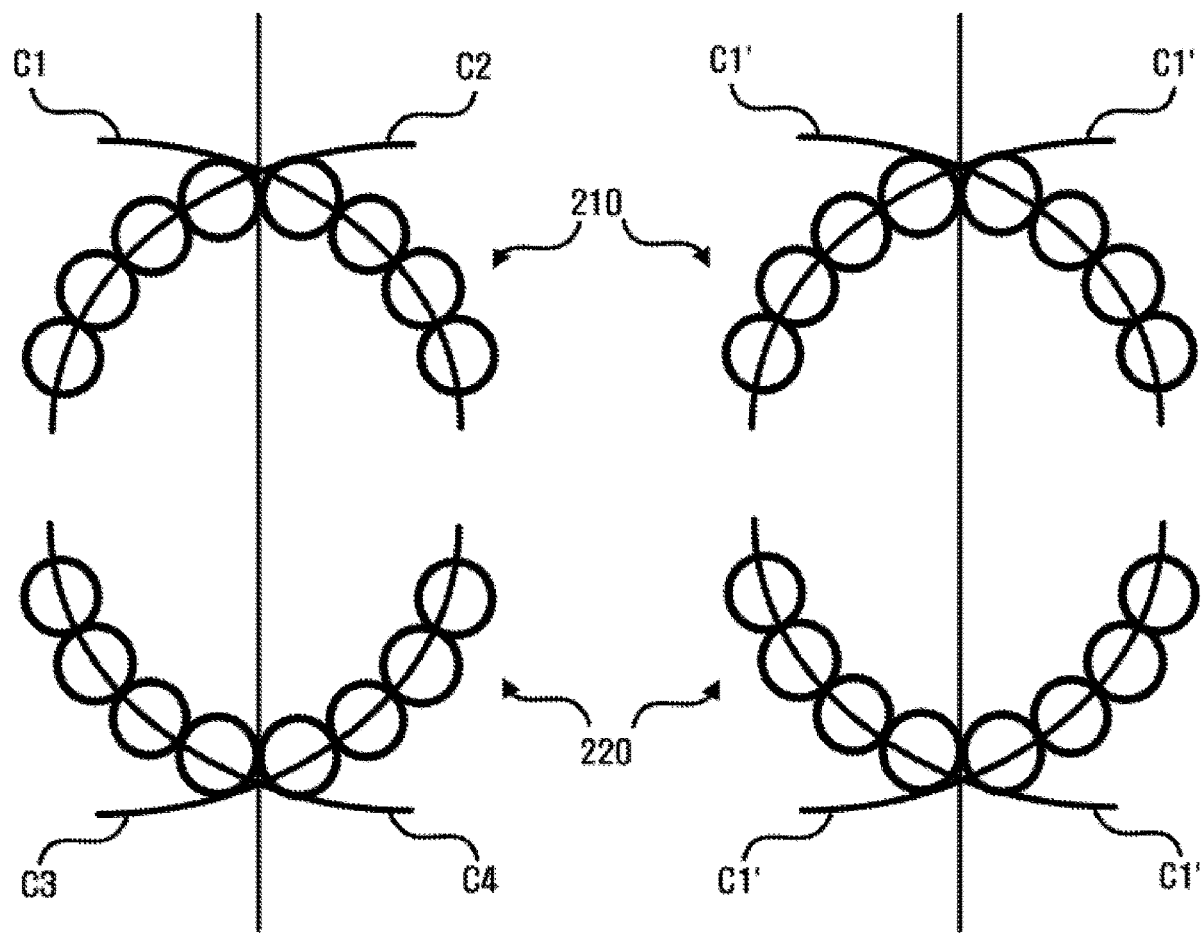
FIG. 3 is a view illustrating an operation of generating dental curves by using a curve selected from among curves in an embodiment.

FIG. 3 is a view illustrating an operation of generating dental curves by using a curve selected from among curves in an embodiment.

Referring to FIG. 3, the teeth of the lower jaw 210 and the teeth of the upper jaw 220 included in a photographed image of teeth are shown. In this case, the apparatus 100 for generating an image of corrected teeth may generate a plurality of curves based on the photographed image of teeth.

The apparatus 100 for generating an image of corrected teeth may generate a first curve C1 from the right side teeth of the lower jaw and a second curve C2 from the left side teeth of the lower jaw by using Equation 1. Furthermore, the apparatus 100 for generating an image of corrected teeth may generate a third curve C3 from the right side teeth of the upper jaw and a fourth curve C4 from the left side teeth of the upper jaw.

The apparatus 100 for generating an image of corrected teeth may select a single curve, formed to generate dental curves having shapes closest to those of corrected virtual teeth, from among the four curves C1 to C4. For example, the apparatus 100 for generating an image of corrected teeth may select a curve having the smallest covariance value, and the curve having the smallest covariance value may be the first curve C1.

The apparatus 100 for generating an image of corrected teeth may select the first curve C1 in order to generate dental curves. The apparatus 100 for generating an image of corrected teeth may generate dental curves by matching a first curve C1′ identical to the first curve C1 to each of the left and right side teeth of both jaws.

Figure 4:
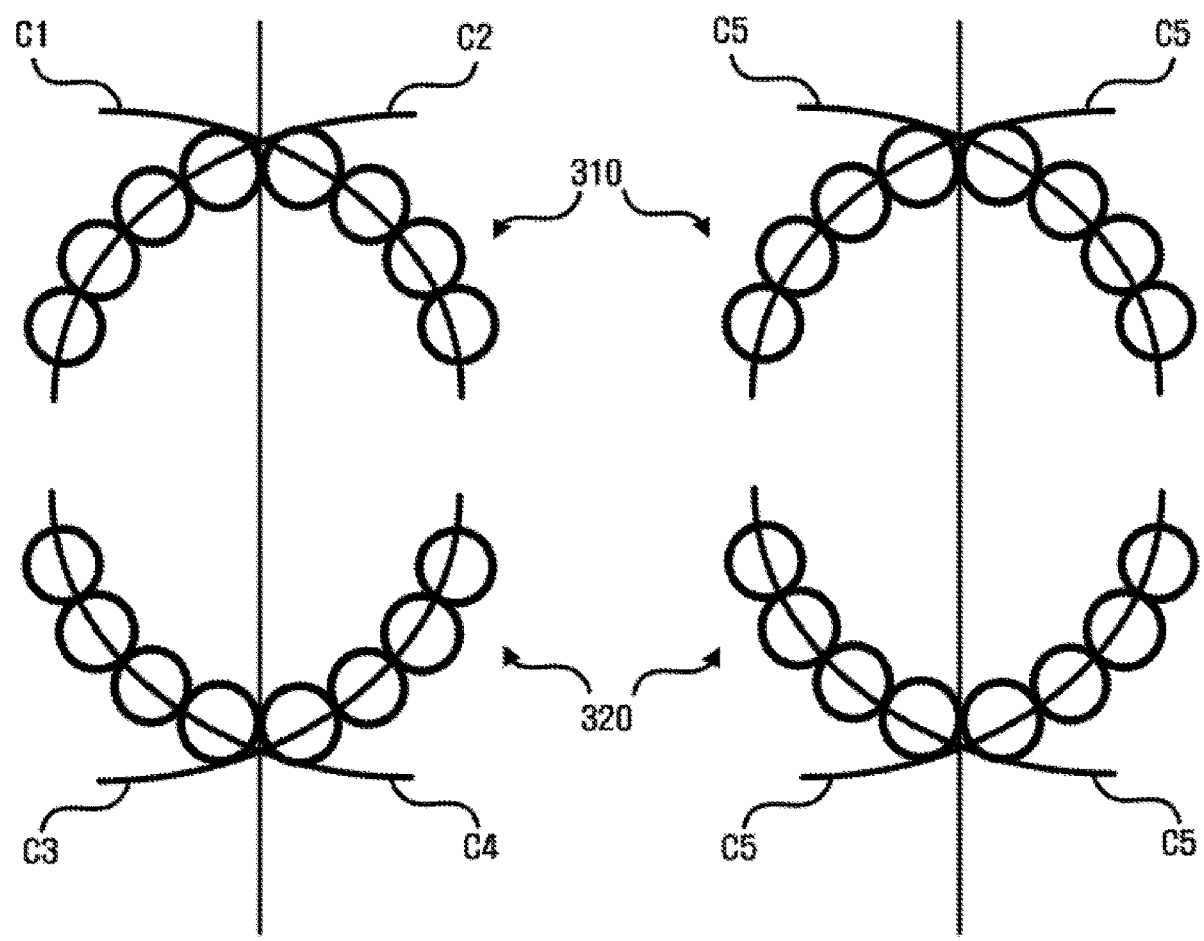
FIG. 4 is a view illustrating an operation of generating dental curves by using an average curve generated by averaging curves in an embodiment.

FIG. 4 is a view illustrating an operation of generating dental curves by using an average curve generated by averaging curves in an embodiment.

Referring to FIG. 4, the apparatus 100 for generating an image of corrected teeth may generate a plurality of curves based on the teeth of the lower jaw 310 and the upper jaw 320. For a description of the generation of a plurality of curves C1 to C4, reference may be made to FIG. 3.

The apparatus 100 for generating an image of corrected teeth may generate a fifth curve C5 by using the average of the curves C1 to C4. For example, the apparatus 100 for generating an image of corrected teeth may calculate the averages of the variables a, b and c of the curves C1 to C4 generated by using Equation 1, and may generate the fifth curve C5 by substituting the calculated values into Equation 1.

The apparatus 100 for generating an image of corrected teeth may generate dental curves by matching the fifth curve C5 to each of the left and right side teeth of both jaws.

Figure 5:
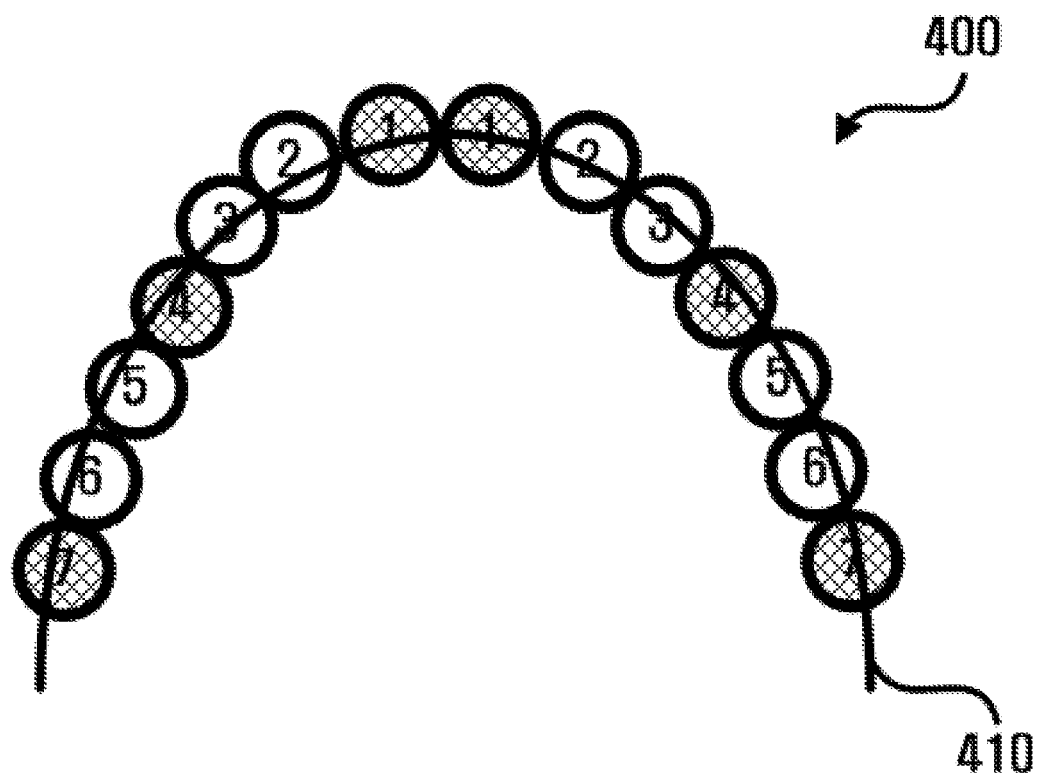
FIG. 5 is a view illustrating an operation of generating a dental curve by using some teeth selected from among the teeth of each of both jaws in an embodiment.

FIG. 5 is a view illustrating an operation of generating a dental curve by using some teeth selected from among the teeth of each of both jaws in an embodiment.

Referring to FIG. 5, the apparatus 100 for generating an image of corrected teeth may select some teeth based on the teeth of the lower jaw 400. In this case, the selected teeth may be teeth Nos. 1, 4, and 7, and may be main teeth used to generate a dental curve 410 from the teeth. In this case, although an operation of selecting some teeth will be described based on the lower jaw 400 shown in FIG. 5, some teeth may be selected based on the teeth of the upper jaw (not shown) other than the lower jaw 400.

The apparatus 100 for generating an image of corrected teeth may select main teeth from each of the upper and lower jaws. In this case, although the apparatus 100 for generating an image of corrected teeth may select corresponding occluding teeth from the upper and lower jaws, the apparatus 100 for generating an image of corrected teeth may select different non-corresponding teeth from the upper and lower jaws. As described above, the apparatus 100 for generating an image of corrected teeth may generate a dental curve in each of the upper and lower jaws through the selection of main teeth.

For example, the apparatus 100 for generating an image of corrected teeth may select six teeth, and may generate the dental curve 410 based on the selected teeth. For this purpose, the apparatus 100 for generating an image of corrected teeth may generate the dental curve 410 by performing spline interpolation based on location information or points representative of the selected teeth.

Figure 6:
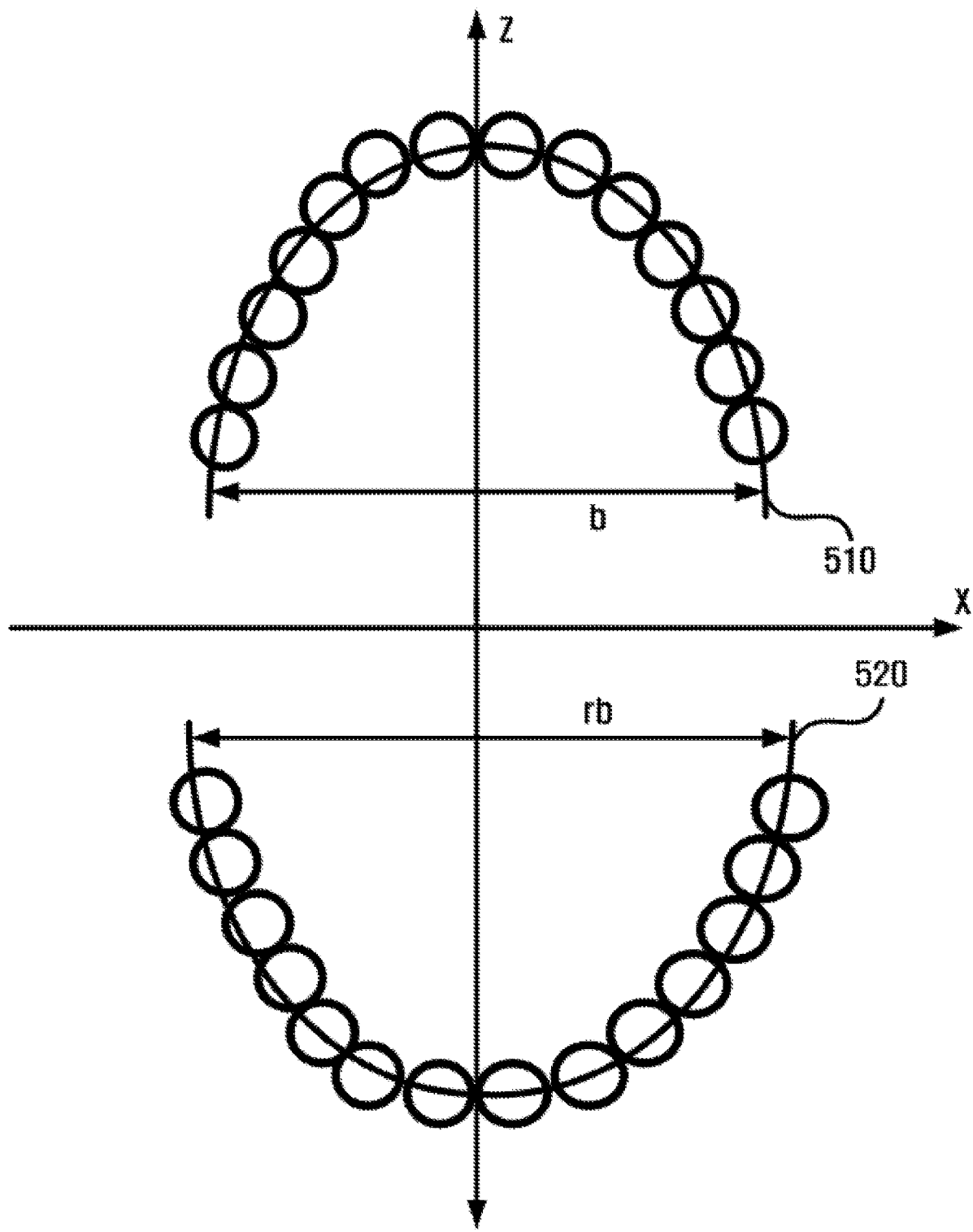
FIG. 6 is a view showing dental curves generated for the alignment of teeth according to an embodiment.

FIG. 6 is a view showing dental curves generated for the alignment of teeth according to an embodiment.

Referring to FIG. 6, the apparatus 100 for generating an image of corrected teeth may generate dental curves 510 and 520 corresponding to both jaws by using FIGS. 3 to 5.

The apparatus 100 for generating an image of corrected teeth may generate the dental curves 510 and 520 on the X axis and the Z axis based on both jaws. Meanwhile, the apparatus 100 for generating an image of corrected teeth may set the dental curve 520 corresponding to the upper jaw so that the dental curve 520 is larger than the dental curve 510 corresponding to the lower jaw at a predetermined ratio by considering the relationship between the upper and lower jaws.

For example, the width of the dental curve 520 corresponding to the upper jaw may be adjusted by using the value of b included in Equation 1. When the X-axis width of the dental curve 510 corresponding to the lower jaw is assumed to be b, the X-axis width of the dental curve 520 corresponding to the upper jaw is rb (r*b, wherein r is weight).

Although the apparatus 100 for generating an image of corrected teeth may adjust the dental curve 520 corresponding to the upper jaw by considering the occlusion of teeth, the apparatus 100 for generating an image of corrected teeth may adjust the width of the dental curve 510 corresponding to the lower jaw based on the dental curve 520 corresponding to the upper jaw when necessary.

The apparatus 100 for generating an image of corrected teeth may use the dental curve of one of both jaws in order to newly generate or correct another dental curve.

Figure 7:
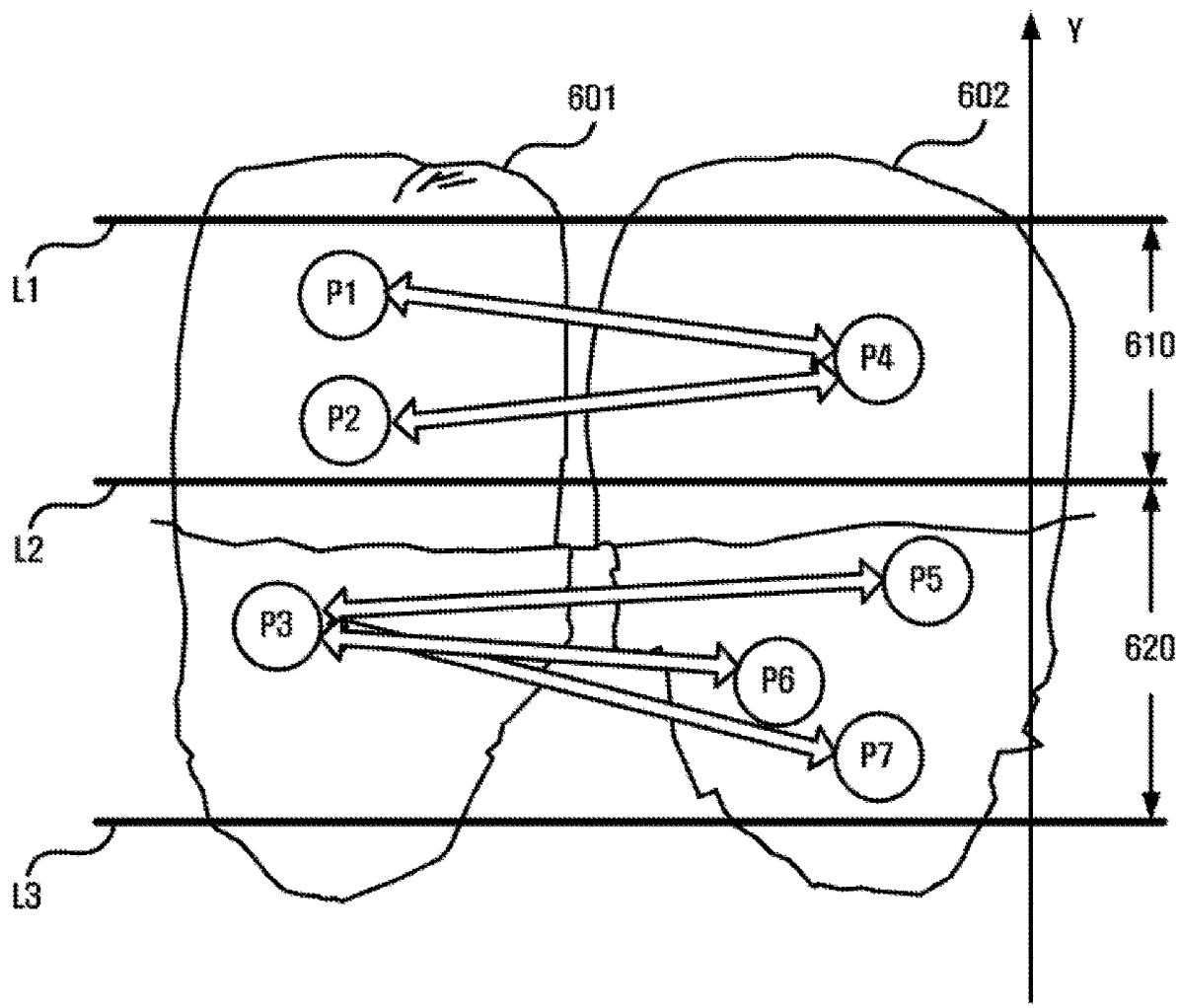
FIG. 7 is a view illustrating the calculation of vector distances for the alignment of teeth according to an embodiment.

FIG. 7 is a view illustrating the calculation of vector distances for the alignment of teeth according to an embodiment.

Referring to FIG. 7, the apparatus 100 for generating an image of corrected teeth may calculate a vector distance between a first tooth 601 and a second tooth 602. For example, the first tooth 601 may be a tooth located in the front along with the second tooth 602, and the location of the first tooth 601 may be determined in advance based on a previously located tooth. However, when the first tooth 601 is a front tooth, the location thereof may be determined based on the Z axis.

The apparatus 100 for generating an image of corrected teeth may set points P1 to P3 on the first tooth 601 and points P4 to P7 on the second tooth 602 in order to calculate vector distances.

Furthermore, the apparatus 100 for generating an image of corrected teeth may define at least two regions based on the Y axis, i.e., the longitudinal direction of teeth, in order to calculate vector distances. For example, the apparatus 100 for generating an image of corrected teeth defines a first region 610 by using a first line L1 and a second line L2 and also defines a second region 620 by using the second line L2 and a third line L3 across the teeth 601 and 602.

Accordingly, the apparatus 100 for generating an image of corrected teeth may calculate vector distances in each of the first region 610 and the second region 620. For example, the apparatus 100 for generating an image of corrected teeth may calculate a vector distance between the first point P1 and fourth point P4 and a vector distance between the second point P2 and the fourth point P4 within the first region 610. Furthermore, the apparatus 100 for generating an image of corrected teeth may calculate a vector distance between the third point P3 and the fifth point P5, a vector distance between the third point P3 and the sixth point P6, and a vector distance between the third point P3 and the seventh point P7 within the second region 620. The calculations of vector distances between the points are indicated by the arrows.

The apparatus 100 for generating an image of corrected teeth does not calculate a vector distance between points located in different regions because it calculates a vector distance within a single region. Accordingly, the apparatus 100 for generating an image of corrected teeth rapidly generates an image of corrected teeth by reducing the time required for the calculation of vector distances during the alignment of teeth.

The apparatus 100 for generating an image of corrected teeth reduces the number of operations required for the calculation of vector distances as the number of regions divided based on the Y axis increases, thereby further reducing the time required for the generation of an image of corrected teeth.

Figure 8:
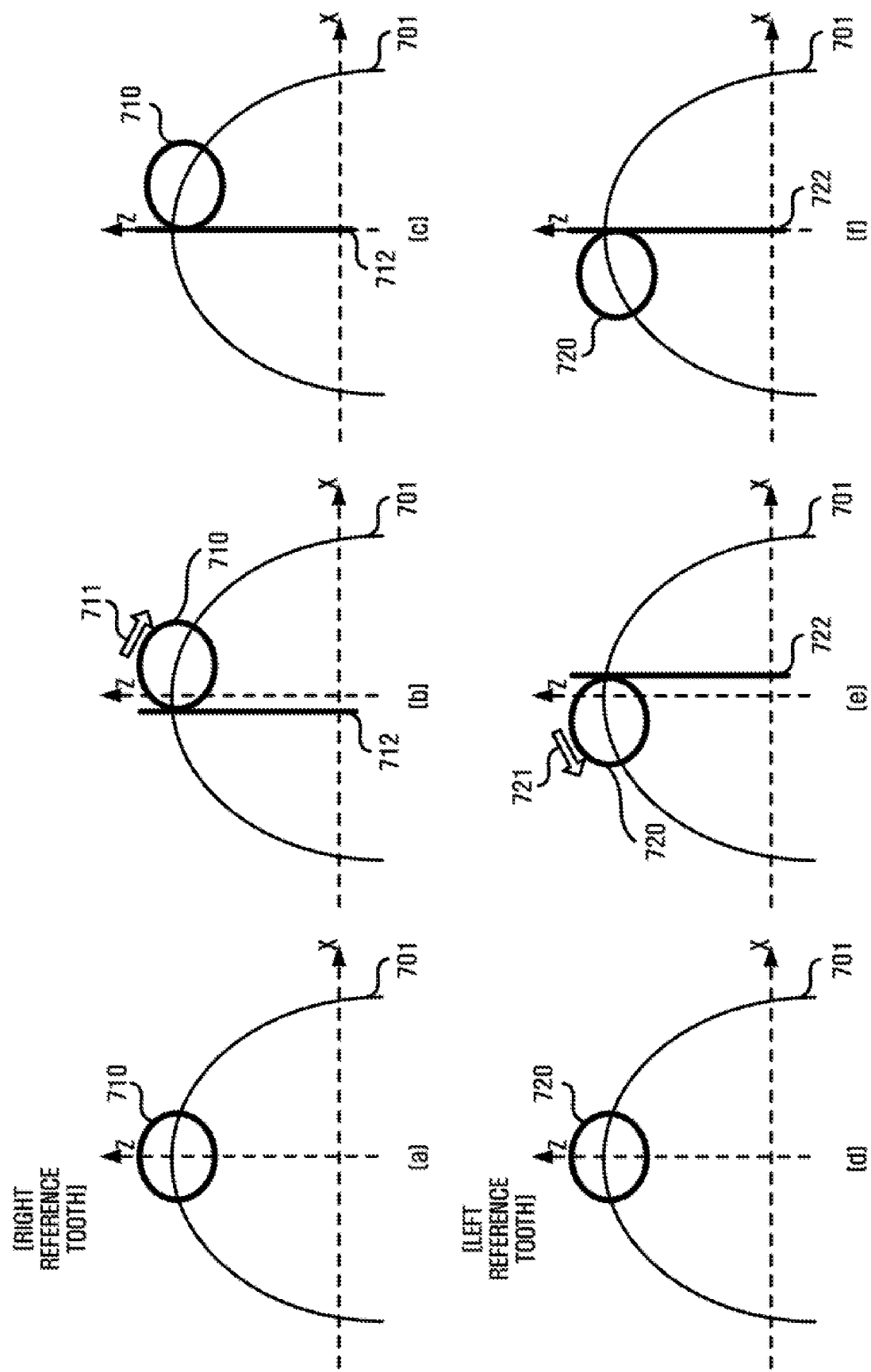
FIG. 8 is a view illustrating an operation of aligning the locations of reference teeth according to an embodiment.

FIG. 8 is a view illustrating an operation of aligning the locations of reference teeth according to an embodiment.

Referring to FIG. 8, the apparatus 100 for generating an image of corrected teeth may align the locations of first reference teeth (for example, reference teeth (a right front teeth 710, and a left front teeth 720)) on a dental curve 701, and may align the locations of the first teeth 710 and 720 based on the Z axis.

The apparatus 100 for generating an image of corrected teeth may align each of the first reference tooth (right) 710 and the second reference tooth (left) 720 based on the Z axis.

First, the operation by which the apparatus 100 for generating an image of corrected teeth aligns the location of the first reference tooth 710 is described, as follows. In FIG. 8(a), the apparatus 100 for generating an image of corrected teeth locates the first reference tooth 710 on the dental curve 701, and locates the center of the first reference tooth 710 at the point the coordinate of which on the X axis is 0. In FIG. 8(b), the apparatus 100 for generating an image of corrected teeth moves the location of the first reference tooth 710 in a first direction 711, which is a plus (+) direction. In FIG. 8(c), the apparatus 100 for generating an image of corrected teeth stops the movement when a point (which is located on a first line 712) that is one of the points on the surface of the first reference tooth 710 and that has the smallest X component has a value equal to or larger than 0. The apparatus 100 for generating an image of corrected teeth determines the point, at which the location of the first reference tooth 710 is stopped, to be the location of the first reference tooth 710.

The operation by which the apparatus 100 for generating an image of corrected teeth aligns the location of the second reference tooth 720 is described, as follows. In FIG. 8(d), the apparatus 100 for generating an image of corrected teeth locates the second reference tooth 720 on the dental curve 701, and locates the center of the second reference tooth 720 at the point the coordinate of which on the X axis is 0. In FIG. 8(e), the apparatus 100 for generating an image of corrected teeth moves the location of the second reference tooth 720 in a second direction 721, which is a minus (−) direction. In FIG. 8(c), the apparatus 100 for generating an image of corrected teeth stops the movement when a point (which is located on the second line 722) that is one of the points on the surface of the second reference tooth 720 and that has the largest X component has a value equal to or smaller than 0. The apparatus 100 for generating an image of corrected teeth determines the point, at which the location of the second reference tooth 720 is stopped, to be the location of the second reference tooth 720.

Figure 9:
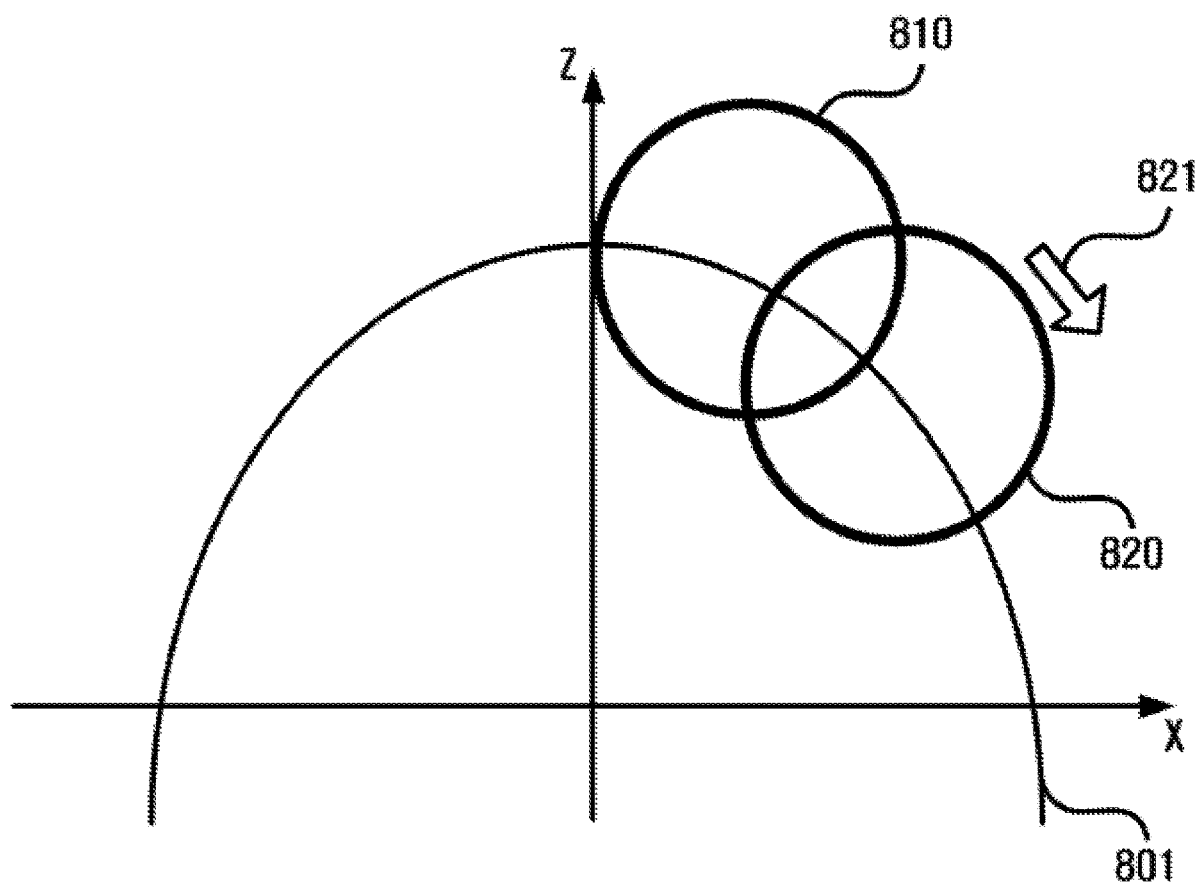
FIG. 9 is a view illustrating an operation of aligning the locations of teeth excluding reference teeth according to an embodiment.

FIG. 9 is a view illustrating an operation of aligning the locations of teeth excluding reference teeth according to an embodiment.

Referring to FIG. 9, the apparatus 100 for generating an image of corrected teeth may align the locations of teeth, used for the generation of an image of corrected teeth, by using vector distances.

The apparatus 100 for generating an image of corrected teeth may calculate a vector distance between a first tooth 810 and a second tooth 820 adjacent to the first tooth 810. The apparatus 100 for generating an image of corrected teeth may determine the locations of the first tooth 810 and the second tooth 820 by moving the first tooth 810 and the second tooth 820 along a dental curve 801 based on the Z axis in a plus (+) direction 821 based on the origin of the X axis based on the calculated vector distance so that the first tooth 810 and the second tooth 820 do not overlap each other. For example, the apparatus 100 for generating an image of corrected teeth may move the second tooth 820 in the plus (+) direction 821 until the number of vector distances having a negative (−) value becomes 0. In other words, the apparatus 100 for generating an image of corrected teeth may move the second tooth 820 until a negative vector distance is not present.

The apparatus 100 for generating an image of corrected teeth may determine the location of the second tooth 820 by moving the second tooth 820 in a minus (−) direction opposite to the plus (+) direction 821 when necessary.

Figure 10:
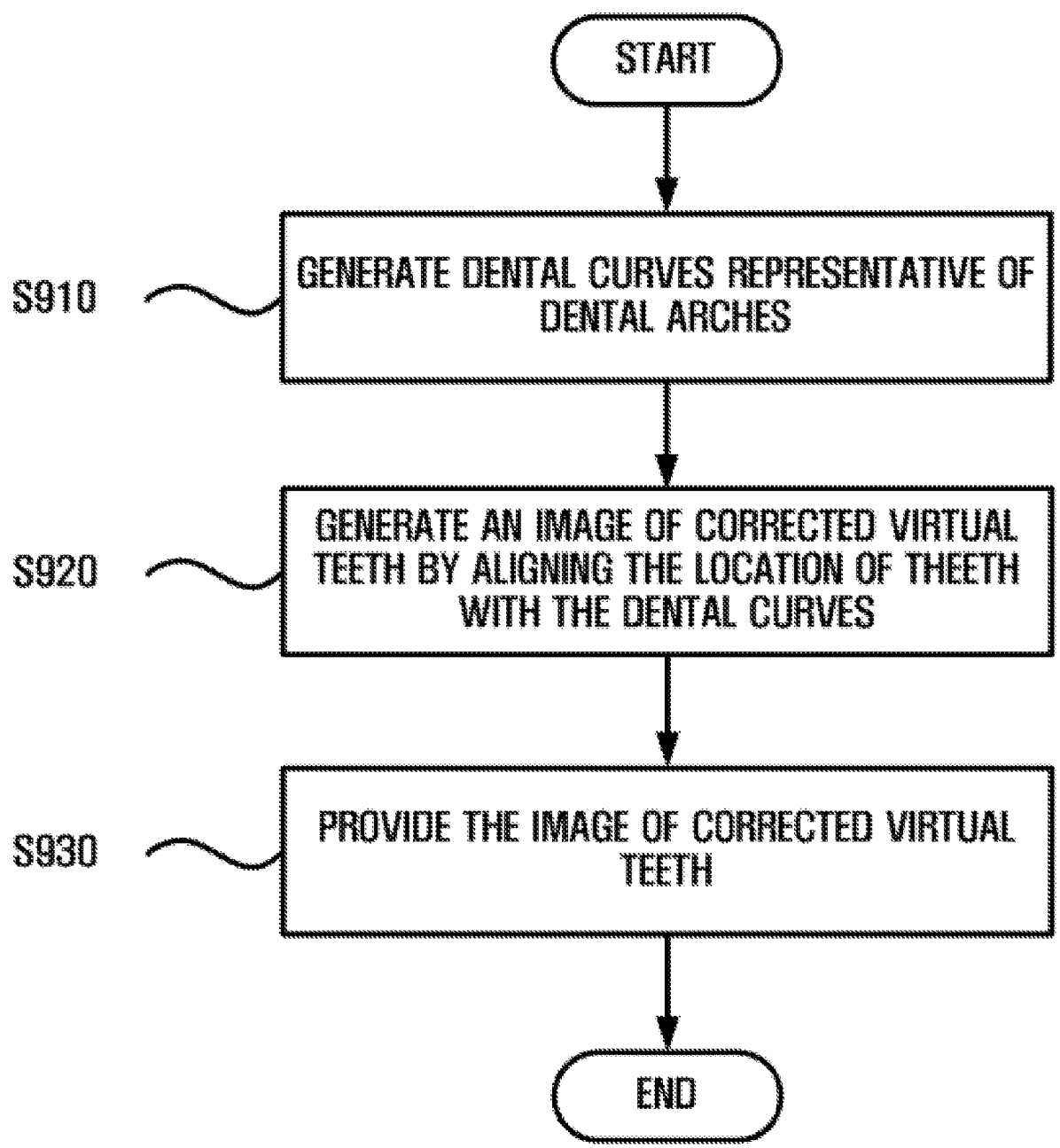
FIG. 10 is a flowchart showing an operation of generating an image of corrected teeth according to an embodiment.

FIG. 10 is a flowchart showing an operation of generating an image of corrected teeth according to an embodiment.

Referring to FIG. 10, the apparatus 100 for generating an image of corrected teeth may generate dental curves representative of dental arches from a photographed image of teeth at step S910. In this case, the dental curves may include two U-shaped dental curves corresponding to the upper and lower jaws, respectively.

For example, the apparatus 100 for generating an image of corrected teeth may generate dental curves, as follows:

First, the apparatus 100 for generating an image of corrected teeth may generate dental curves by generating four curves for the left and right side teeth of both jaws and then selecting a single curve from among the four curves or calculating the average of the four curves. In this case, the apparatus 100 for generating an image of corrected teeth may use the function described in Equation 1 in order to generate the curves.

Second, the apparatus 100 for generating an image of corrected teeth may generate dental curves by using the curve function described in Equation 2.

Third, the apparatus 100 for generating an image of corrected teeth may generate a dental curve by selecting at least some teeth from among the teeth of each of both jaws and then performing spline interpolation based on the selected teeth. For this purpose, the apparatus 100 for generating an image of corrected teeth may select main teeth important to the generation of dental arches.

Furthermore, the apparatus 100 for generating an image of corrected teeth may increase the width of a dental curve corresponding to the upper jaw so that the width of the dental curve corresponding to the upper jaw is larger than that of a dental curve corresponding to the lower jaw at a predetermined ratio by considering the occlusion of the teeth of both jaws.

The apparatus 100 for generating an image of corrected teeth may generate an image of corrected virtual teeth by aligning the locations of the teeth along the dental curves at step S920. The apparatus 100 for generating an image of corrected teeth may calculate vector distances in regions divided based on the longitudinal direction of the teeth. In this case, the apparatus 100 for generating an image of corrected teeth may calculate vector distances based on points set on adjacent teeth.

The apparatus 100 for generating an image of corrected teeth may align the locations of the teeth on the dental curves without an overlap while determining whether a corresponding vector distance calculated based on the components of the vector distance is positive (+) or negative (−).

The apparatus 100 for generating an image of corrected teeth may provide the generated image of corrected teeth at step S930. The apparatus 100 for generating an image of corrected teeth may provide the shape of the corrected virtual teeth to a user by providing the image of corrected teeth via a display screen or the like.

The term "unit" used herein refers to, but is not limited to, a software component or a hardware component, such as a field programmable gate array (FPGA) or application specific integrated circuit (ASIC), that performs a specific task. A unit may be configured to reside on an addressable storage medium, and may be configured to be executed on one or more processors. Accordingly, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The functions provided in components and units may be combined into a smaller number of components and units, or may be separated into additional components and units.

Furthermore, components and units may be configured to be executed on one or more central processing units (CPUs) inside a device or security multimedia card.

Furthermore, the method of generating an image of corrected teeth according to the embodiment may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the method of generating an image of corrected teeth according to the embodiment may be implemented in such a way that a computer program, such as that described above, is executed by a computing device. The computing device may include at least part of a processor, memory, a storage device, a high-speed interface accessing the memory and a high-speed expansion port, and a low-speed interface accessing a low-speed bus and a storage device. These components are connected to each other by means of various buses, and may be mounted on a common motherboard or by means of another appropriate method.

In this case, the processor may process instructions in a computing device. For example, these instructions may be instructions that are stored in memory or a storage device and that are used to display graphics information adapted to provide a graphical user interface (GUI) to an external input/output device, for example, a display connected to a high-speed interface. As another embodiment, a plurality of processors and/or a plurality of buses may be appropriately used along with a plurality of pieces of memory and memory forms. Furthermore, the processor may be implemented as a chipset that includes chips including a plurality of independent analog and or digital processors.

Furthermore, the memory stores information in a computing device. For example, the memory may include a volatile memory unit or a set of volatile memory units. As another example, the memory may include a non-volatile memory unit or a set of non-volatile memory units. Furthermore, the memory may be, for example, another type of computer-readable medium, such as a magnetic or optical disk.

Additionally, the storage device may provide a large-sized storage space to a computing device. The storage device may be a computer-readable medium or a configuration including such a medium. For example, the storage device may include devices included in a storage area network (SAN), or may include another component. The storage device may be a floppy disk device, a hard disk device, an optical disk device, a tape device, flash memory, or another semiconductor memory device or device array similar thereto.

According to the above-described embodiments, there are provided the apparatus and method for generating an image of corrected teeth, which may provide an image of corrected virtual teeth based on an image of teeth of a user.

According to the above-described embodiments, there are provided the apparatus and method for generating an image of corrected teeth, which may automate an operation of generating an image of corrected virtual teeth.

According to the above-described embodiments, there are provided the apparatus and method for generating an image of corrected teeth, which may improve convenience by minimizing the intervention of a user in the generation of an image of corrected virtual teeth.

According to the above-described embodiments, there are provided the apparatus and method for generating an image of corrected teeth, which may minimize the time required for the generation of an image of corrected virtual teeth.

The advantages that can be obtained from the disclosed embodiments are not limited to the above-described advantages, and other advantages that have not been described above will be clearly understood from the foregoing description by those having ordinary knowledge in the art to which the present invention pertains.

The above-described embodiments are merely illustrative, and it will be understood by those having ordinary knowledge in the art to which the present invention pertains that modifications and variations may be easily made without departing from the technical spirit and essential features of the present invention. Therefore, it should be appreciated that the above-described embodiments are illustrative but are not limitative in all aspects. For example, each component which is described as being configured in a single form may be practiced in a distributed form. In the same manner, components that are described as being configured in a distributed form may be practiced in an integrated form.

The scope of the present invention is defined by the attached claims, rather than the foregoing detailed description. Furthermore, all modifications and variations derived from the meanings, scope and equivalents of the claims should be construed as falling within the scope of the present invention.

What is claimed is:

1. An apparatus for generating an image of corrected teeth, the apparatus comprising:
   a control unit configured to generate dental curves representative of dental arches after completion of correction from an image of teeth, and to generate an image of corrected virtual teeth by aligning locations of the teeth with the dental curves; and
   an input/output unit configured to provide the image of corrected virtual teeth via a screen;
   wherein the control unit is further configured to generate the dental curves in a form of U-shaped lines corresponding to both jaws;
   locate the dental curves on an X axis corresponding to a direction parallel to a facial surface and a Z axis corresponding to a direction vertical to the facial surface; and
   calculate vector distances between points set on adjacent ones of the teeth on a Y axis based on a longitudinal direction of the teeth within at least two regions divided based on the Y axis.

2. The apparatus of claim 1, wherein the control unit is further configured to model the dental curves with the following equation using a mathematical constant:

$$z = a * e^{b*x} + c$$

where a is a variable representative of a scale in the Z axis, e is the mathematical constant, b is a variable representative of a scale in the X axis, and c is a variable representative of parallel translation of the dental curves.

3. The apparatus of claim 2, wherein the control unit is further configured to:
   generate curves corresponding to a left dental arch of a lower jaw, a right dental arch of the lower jaw, a left dental arch of an upper jaw, and a right dental arch of the upper jaw by using the equation based on the teeth; and
   select a curve having a smallest covariance value from among the curves, and generate the dental curves by using the selected curve.

4. The apparatus of claim 2, wherein the control unit is further configured to:
   generate curves corresponding to a left dental arch of a lower jaw, a right dental arch of the lower jaw, a left dental arch of an upper jaw, and a right dental arch of the upper jaw by using the equation based on the teeth; and
   generate the dental curves by using an average curve calculated based on an average of the curves.

5. The apparatus of claim 1, wherein the control unit is further configured to increase a width of the dental curve corresponding to the upper jaw on the X axis by applying a predetermined weight to the dental curve corresponding to the lower jaw and to set the increased width for the dental curve corresponding to the upper jaw.

6. The apparatus of claim 1, wherein the control unit is further configured to model the dental curves with the following equation using a curve function:

$$z = a_n x^n + a_{n-1} x^{n-1} + \cdots + a_1 x^1 + a_0 x^0$$

where n is a natural number, $a_n$ is a variable used to apply a slope to the dental curves, and $x^n$ is a polynomial curve function used to generate the dental curves.

7. The apparatus of claim 1, wherein the control unit is further configured to select at least one tooth from among teeth of each of the dental arches and to generate a corresponding one of the dental curves by performing spline interpolation based on locations of the selected teeth.

8. The apparatus of claim 1, wherein the control unit is further configured to:
   for a tooth located on a right side of each of both the jaws, determine a corresponding one of the vector distances to be negative (−) when a Z-axis component of the vector distance is positive (+) and an X-axis component of the vector distance is positive (+), and determine a corresponding one of the vector distances to be positive (+) when a Z-axis component of the vector distance is negative (−) and an X-axis component of the vector distance is negative (−); and for a tooth located on a left side of each of both the jaws, determine a corresponding one of the vector distances to be negative (−) when a Z-axis component of the vector distance is positive (+) and an X-axis component of the vector distance is negative (−), and determine a corresponding one of the vector distances to be positive (+) when a Z-axis component of the vector distance is negative (−) and an X-axis component of the vector distance is positive (+).

9. The apparatus of claim 8, wherein the control unit is further configured to:

align a location of a median point between reference teeth corresponding to front teeth among the teeth of both the jaws based on the Z axis; and determine locations of the reference teeth by moving the reference teeth so that a point having a smallest X-axis component on a surface of a right one of the reference teeth has a value equal to or larger than 0 or so that a point having a largest X-axis component on a surface of a left one of the reference teeth has a value equal to or smaller than 0, determine locations of remaining teeth excluding the reference teeth by performing movement until a vector distance having a negative value based on teeth that are located in a front and adjacent to each other is not present, the front being a closer location to the front teeth.

10. A method of generating an image of corrected teeth, the method being performed by an apparatus for generating an image of corrected teeth, the method comprising:

generating dental curves representative of dental arches after completion of correction from an image of teeth;

generating an image of corrected virtual teeth by aligning locations of the teeth with the dental curves; and providing the image of corrected virtual teeth via a screen;

wherein generating the dental curves comprises generating the dental curves in a form of U-shaped lines corresponding to both jaws; and locating the dental curves on an X axis corresponding to a direction parallel to a facial surface and a Z axis corresponding to a direction vertical to the facial surface;

wherein generating the image of corrected virtual teeth comprises calculating vector distances between points set on adjacent ones of the teeth on a Y axis based on a longitudinal direction of the teeth within at least two regions divided based on the Y axis.

11. The method of claim 10, wherein generating the dental curves in the form of U-shaped lines comprises:

modeling the dental curves with the following equation using a mathematical constant:

$$z = a * e^{b*x} + c$$

where a is a variable representative of a scale in the Z axis, e is the mathematical constant, b is a variable representative of a scale in the X axis, and c is a variable representative of parallel translation of the dental curves.

12. The method of claim 10, wherein generating the dental curves comprises modeling the dental curves with the following equation using a curve function:

$$z = a_n x^n + a_{n-1} x^{n-1} + \cdots + a_1 x^1 + a_0 x^0$$

where n is a natural number, $a_n$ is a variable used to apply a slope to the dental curves, and $x^n$ is a polynomial curve function used to generate the dental curves.

13. The method of claim 10, wherein generating the dental curves comprises selecting at least one tooth from among teeth of each of the dental arches, and generating a corresponding one of the dental curves by performing spline interpolation based on locations of the selected teeth.

14. The method of claim 10, wherein calculating the vector distances within the at least two regions comprises:

for a tooth located on a right side of each of both the jaws, determining a corresponding one of the vector distances to be negative (−) when a Z-axis component of the vector distance is positive (+) and an X-axis component of the vector distance is positive (+), and determining a corresponding one of the vector distances to be positive (+) when a Z-axis component of the vector distance is negative (−) and an X-axis component of the vector distance is negative (−); and for a tooth located on a left side of each of both the jaws, determining a corresponding one of the vector distances to be negative (−) when a Z-axis component of the vector distance is positive (+) and an X-axis component of the vector distance is negative (−), and determining a corresponding one of the vector distances to be positive (+) when a Z-axis component of the vector distance is negative (−) and an X-axis component of the vector distance is positive (+).

15. The method of claim 14, wherein generating the image of corrected virtual teeth further comprises:

aligning a location of a median point between reference teeth corresponding to front teeth among the teeth of both the jaws based on the Z axis; and determining locations of the reference teeth by moving the reference teeth so that a point having a smallest X-axis component on a surface of a right one of the reference teeth has a value equal to or larger than 0 or so that a point having a largest X-axis component on a surface of a left one of the reference teeth has a value equal to or smaller than 0, wherein generating the image of corrected virtual teeth further comprises determining locations of remaining teeth excluding the reference teeth by performing movement until a vector distance having a negative value based on teeth that are located in a front and adjacent to each other becomes 0 is not present, the front being a closer location to the front teeth.

16. A non-transitory computer-readable storage medium having stored thereon a computer program that, when executed by a processor, causes the processor to execute a method of generating an image of corrected teeth, the method comprising:

generating dental curves representative of dental arches after completion of correction from an image of teeth;

generating an image of corrected virtual teeth by aligning locations of the teeth with the dental curves; and providing the image of corrected virtual teeth via a screen;

wherein generating the dental curves comprises generating the dental curves in a form of U-shaped lines corresponding to both jaws; and locating the dental curves on an X axis corresponding to a direction parallel to a facial surface and a Z axis corresponding to a direction vertical to the facial surface;

wherein generating the image of corrected virtual teeth comprises calculating vector distances between points set on adjacent ones of the teeth on a Y axis based on a longitudinal direction of the teeth within at least two regions divided based on the Y axis.

\* \* \* \* \*